United States Patent

Ganster et al.

(10) Patent No.: US 6,506,280 B2
(45) Date of Patent: Jan. 14, 2003

(54) ADHESIVE COMPOSITIONS

(75) Inventors: Otto Ganster, Odenthal (DE); Ralf Werner, Dormagen (DE); Jörg Büchner, Bergisch Gladbach (DE); Wolfgang Henning, Kürten (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/803,502

(22) Filed: Mar. 9, 2001

(65) Prior Publication Data

US 2001/0034404 A1 Oct. 25, 2001

(30) Foreign Application Priority Data

Mar. 16, 2000 (DE) .......................... 100 12 826

(51) Int. Cl.$^7$ ..................... C09J 175/04; C09J 175/02; C09J 175/00; C08J 3/03; C08G 18/72
(52) U.S. Cl. ................ 156/331.4; 156/531.7; 524/507; 524/591; 524/839
(58) Field of Search ................ 524/507, 591, 524/839; 156/331.4, 331.7

(56) References Cited

U.S. PATENT DOCUMENTS

| | | | | |
|---|---|---|---|---|
| 3,475,200 A | | 10/1969 | Kallert et al. ............... | 117/94 |
| 4,888,124 A | | 12/1989 | Blum et al. ............... | 252/182.2 |
| 5,159,011 A | * | 10/1992 | Rau et al. ............... | 524/562 |
| 6,087,439 A | * | 7/2000 | Ganster et al. ............ | 524/591 |

FOREIGN PATENT DOCUMENTS

| | | | |
|---|---|---|---|
| EP | 467168 | * | 1/1992 |
| EP | 922720 | * | 6/1999 |
| WO | 93/25599 | * | 12/1993 |
| WO | 97/454475 | | 12/1997 |
| WO | 99/29755 | * | 6/1999 |

* cited by examiner

*Primary Examiner*—Rabon Sergent
(74) *Attorney, Agent, or Firm*—Joseph C. Gil; Thomas W. Roy

(57) ABSTRACT

The present invention relates to an aqueous dispersion containing an isocyanate-reactive polymer and a polyisocyanate, wherein the polyisocyanate has a melting or softening point of >30° C. and is in the form of a finely divided powder having a mean particle diameter of less than 100 μm. The present invention also relates to an adhesive composition containing this dispersion and to a process for bonding substrates with this composition.

20 Claims, No Drawings

ADHESIVE COMPOSITIONS

BACKGROUND OF THE INVENTION

1. Field of the Invention

The present invention relates to aqueous dispersions containing polyisocyanates in powdered form and isocyanate-reactive polymers, to adhesive compositions containing these dispersions and to a process for bonding substrates with these compositions, which crosslink at room temperature.

2. Description of the Prior Art

One-component (1K) polyurethane dispersions, which are used for heat-activated bonds on the basis of their linear polymer chain that crystallizes at temperatures below 100° C., preferably below 60° C., give low 1K thermal stabilities without additional isocyanate crosslinking. For that reason they are usually processed in combination with liquid polyisocyanates which are emulsifiable in the aqueous dispersion, for example Desmodur DA polyisocyanate (Bayer AG). Coatings prepared from these two-component (1K) compositions possess markedly better thermal stability values. For example, in the bonding of an SBR rubber (SBR vulcanate (Nora test), PFI—Prüf- und Forschungsinstitut für die Schuhindustrie—Pirmasens), commercial polyurethane dispersions for heat-activated adhesives give a softening point of approximately 65° C. without isocyanate crosslinking, but when crosslinked with Desmodur DA polyisocyanate, the softening point is approximately 130° C. However, that gain is only achieved with the cost of a higher technical outlay for 2K processing, in conjunction with possible sources of error. This is because for each individual batch it is necessary to disperse the isocyanate crosslinking agent, which is to be prepared separately, homogeneously and precisely in terms of quantity.

Although the storage stability of those mixtures is sufficient to allow the adhesive to be processed without difficulty over a period of one day, it is not sufficient to allow the crosslinking agent to be incorporated into the adhesive formulation by the adhesive manufacturer.

1K reaction compositions with pulverulent polyisocyanates, in which the isocyanates are incorporated into the formulation without previously being deactivated at the surface, are known. DE-A 1 570 548 describes storable, heat-curable polyurethane compositions with powdered uretdione isocyanates which have not undergone surface deactivation. They can be stored at room temperature for a period of from several weeks to a few months and must be cured by heating for 30 to 90 minutes at temperatures of 100 to 160° C. However, DE-A 1 570 548 does not describe the use of pulverulent, non-deactivated solid isocyanates in aqueous polymer dispersions.

EP-A 0 467 168 claims compositions containing surface-deactivated aqueous polyisocyanate solid suspensions and polymer dispersions having NCO-reactive groups for flexible coatings for textiles substrates. The compositions have a long storage life. The coatings are post-crosslinked at elevated temperature at the same time as they are dried. The composition is produced by mixing the polymer dispersion with the dispersion of the surface-deactivated polyisocyanate. The dispersion and surface deactivation of the polyisocyanate are described in EP-A 0 204 970, which requires a separate operation prior to incorporation into the polymer dispersion.

EP-A 0 922 720 describes the use of aqueous dispersions which contain at least one surface-deactivated solid polyisocyanate and at least one isocyanate-reactive polymer for the production of coatings or powders which are storage stable at room temperature, have latent reactivity and are crosslinked by heating. The preparation of the polyisocyanate dispersion and the surface deactivation are also carried out in accordance with EP-A 0 204 970 as a separate operation prior to incorporation into the dispersion. Although deactivation of the isocyanate could result in a relatively good storage life of the dried polymer film, it does require the additional processing steps.

The search for aqueous adhesive dispersion systems, which are in one-component form for final processing, i.e., they can be processed without the addition of further crosslinking agents, and which crosslink after application without additional measures to form heat-resistant bonds, has for a long time been an intensively researched field.

Accordingly, an object of the present invention is to provide a one-component adhesive composition that has an adequate pot life is self-crosslinking without special aftertreatment.

This object may be achieved with the one-component, storage stable compositions according to the invention which contain finely divided polyisocyanate powders and aqueous isocyanate-reactive polymer dispersions and which may be crosslinked at room temperature.

SUMMARY OF THE INVENTION

The present invention relates to an aqueous dispersion containing an isocyanate-reactive polymer and a polyisocyanate, wherein the polyisocyanate has a melting or softening point of >30° C. and is in the form of a finely divided powder having a mean particle diameter of less than 100 μm.

The present invention also relates to an adhesive composition containing this dispersion and to a process for bonding substrates with this composition.

DETAILED DESCRIPTION OF THE INVENTION

The storage stable compositions according to the invention are produced by mixing finely divided polyisocyanate powders or corresponding pastes in inert carrier liquids with aqueous isocyanate-reactive polyurethane dispersions. In accordance with the present invention the polyisocyanates include diisocyanates.

A valuable property of the compositions according to the invention results from the fact that, contrary to known systems, the finely divided solid polyisocyanates are mixed into the aqueous dispersions directly, i.e., without deactivation or encapsulation (see Example 1). Compositions are obtained which surprisingly and unexpectedly can be stored at conventional storage temperatures of 20° to 30° C. without substantial losses in the isocyanate content (see Example 2).

The adhesive bonds produced using such compositions crosslink even at room temperature over a period of several days, even if no additional tempering is carried out. To the contrary in the examples of EP-A 0 922 720 when a deactivated solid isocyanate is used, an additional tempering step at elevated temperature is required for the crosslinking (see Examples 3.1 and 3.2). Also, in contrast to EP-A 0 922 720, no catalysts are required for accelerating the reaction of the isocyanates. In polyurethane dispersions in particular, which generally contain polyester polyols as the base raw materials, the use of metal catalysts would be very disadvantageous with regard to the hydrolytic stability of the polymer chain.

Crosslinking of the compositions according to the invention leads to a considerably increased softening point and hydrolytic stability of the bond. In addition, in comparison with liquid isocyanate crosslinking agents, such as Desmodur DA polyisocyanates, and especially in comparison with deactivated solid isocyanates, markedly increased strengths are found in the peel test on plasticized PVC.

It is of particular importance that when using polyurethane dispersions prepared on the basis of crystallizing polymer chains, the adhesive films can be stored for several days or weeks at room temperature prior to the heat-activated bonding that is required in the case of such polymers (i.e., bonding by decrystallization of the polymer chain) without the heat activatability being impaired by the onset of crosslinking. However, after the heat-activated bonding has been carried out using the correct activation conditions (see Example 3.1.1), the crosslinking reaction proceeds at room temperature within several days without difficulty.

By using the compositions according to the invention based on non-deactivated solid isocyanates in polymer dispersions, the additional work involved in tempering the bond and the risk of hydrolysis of the polymer chain by catalysts, which are optionally used, are therefore avoided.

Although the compositions according to the invention exhibit reduced storage stability of the dried adhesive film as compared with the compositions described in EP-A 0 922 720, that is not a relevant problem in terms of application because the period of time until the onset of crosslinking that impedes adhesiveness is still totally sufficient even without deactivation of the polyisocyanate surface (see Examples 4.1 and 4.2).

For the production of the compositions according to the invention, the pulverulent polyisocyanate, optionally adjusted to the desired particle size limit, for example by sieving, is mixed into the polymer dispersion. In order to simplify the milling process and avoid the formation of dust, the powder may be made into a paste in an inert carrier liquid. The process simplifies previously known processes since the separate preparation of a dispersion of the "deactivated" solid isocyanate is not required. In particular, the excess enveloping amine in the dispersion of the deactivated solid isocyanate, which has a negative effect on colloidal chemical stability, is avoided. The excess enveloping amine would have to be removed from the aqueous phase by filtering off the deactivated solid. That complex preparation step is not necessary in the case of the use according to the invention of the non-deactivated solid isocyanates.

Production is optionally carried out in combination with additives such as protective colloids, emulsifiers, thickeners, solvents, plasticizers, pigments, fillers, dyes and other known additives employed in the preparation of adhesive dispersions and coatings.

The polyisocyanates preferably have melting or softening points of >30° C. and are mixed into the aqueous dispersions in the form of finely divided powders or in the form of pastes in inert carrier liquids having a mean particle size of substantially less than 100 $\mu$m, preferably less than 50 $\mu$m.

The viscosity of the dispersions is adjusted to at least 500 mPas, preferably to at least 2000 mPas.

Preferred polymer dispersions are isocyanate-reactive polyurethane or polyurea dispersions as well as polymers of 2-chlorobutadiene.

Special preference is given to dispersions of isocyanate-reactive polyurethanes which are composed of crystallized polymer chains which, when measured by means of thermomechanical analysis, decrystallize at least partially at temperatures of less than 100° C., preferably less than 90° C. and more preferably less than 65° C.

Preferred polyisocyanates include dimerization products, trimerization products and urea derivatives of TDI or IPDI. The dispersions according to the invention are preferably used for the production of coatings or adhesive bonds which,
after drying, crosslink over a period of a few days without the additional supply of heat. They have a markedly improved softening point, fastness to water and resistance to solvents.

In order to produce such adhesive bonds, the dried adhesive layer on the substrate to be bonded is decrystallized by heating for a short time, preferably at a temperature of less than 110° C., and joined in the decrystallized state. The adhesive layer may also be dried on a substrate and then pressed with a foil material which has been softened plastically by heating, so that the foil in contact with the adhesive film assumes a temperature above the decrystallization temperature of the polymer in the adhesive film as described above.

EXAMPLES

Example 1

Production of a Composition Containing a Polymer Dispersion and TDI Dimer (Desmodur TT, Available from Bayer AG)

100 g of a polyurethane dispersion (U.S. Pat. No. 5,432, 228, Example 1) were adjusted to a viscosity of approximately 3000 mPa.s (23° C.) by the addition of a commercial thickener (Borchigel L 75, Borchers GmbH, DE). 5 g of powdered TDI dimer (Desmodur TT, Rhein Chemie, DE), particle size: <63 $\mu$m; NCO content: 24.0%; m.p. 156° C. were dispersed therein using an Ultraturrax mixer at 9500 rpm (2.5 minutes). A coagulate-free mixture having an NCO content, measured immediately, of 1.3% was obtained.

Example 2

Storage Stability of the Isocyanate Content in the Composition of Example 1

The isocyanate content was determined in the freshly prepared mixture and in the liquid mixture stored for a period of up to 3 months at 23° C. The following table shows that the content of isocyanate-reactive groups remains substantially unchanged over three months.

| Storage time of the preparation | NCO content (%)* | Viscosity at 23° C. ($\eta$) |
|---|---|---|
| immediately | 1.3 | 3000 |
| 24 h | 1.3 | 2700 |
| 1 week | 1.1 | 2700 |
| 2 weeks | 1.1 | 3200 |
| 4 weeks | 1.2 | 3500 |
| 8 weeks | 1.2 | 3700 |
| 12 weeks | 1.2 | 4100 |

*The samples were shaken prior to the NCO determination in order to avoid inhomogeneities as a result of sedimentation.

Example 3

Effect of Storage of the Liquid Adhesive Composition on the Adhesive Properties After Bonding by Heat Activation

Example 3.1

Determination of Thermal Stability (Softening Point=Shear Stress) After Shock Activation Preparation of the Samples The test specimens of Nora rubber (SBR) and plasticised PVC (30% DOP) were roughened with abrasive paper (grain=80) immediately before application of the adhesive. The adhesive formulation was applied by means of a brush to both sides of the surface to be bonded, which measured 20×10 mm. The adhesive layer was dried for 60 minutes at 23° C./50% relative humidity.

Shock Activation

The surfaces to be bonded were irradiated for 3, 5 and 10 seconds with an IR radiator from Funk (Schockaktiviergerät 2000). The adhesive film on the Nora rubber was warmed to 49° C., 65° C. or 115° C. depending on the duration of activation. Activation of the adhesive film on the plasticized PVC sample for 10 seconds gave a surface temperature of 92° C. The decrystallization temperature of the polymer chain of the polyurethane dispersion (U.S. Pat. No. 5,432,228, Example 1) used was 55° C., which was exceeded with an activation time of 5 and 10 seconds. Bonding was carried out immediately after heat activation of the adhesive-coated test specimens, by placing the activated adhesive layers together and pressing them in a press for one minute at 4 bar. The test specimens so prepared were stored for 7 days at 23° C. and 50% relative humidity.

Heat Test

The test specimens were subjected to a load of 4 kg and brought to a temperature of 40° C. over a period of 30 minutes in a heating chamber. The test specimens were then heated to 150° C. at a linear heating rate of 0.5° C./minute. The softening point, that is to say the temperature in °C. at which the bond failed under the 4 kg load, was recorded. 5 individual measurements were carried out in each case.

Example 3.1.1

Results on SBR (NORA Rubber)

|  | Activation conditions | | |
| --- | --- | --- | --- |
| Storage time of the composition | 3" (49° C.) Softening (° C.) | 5" (65° C.) | 10" (105° C.) |
| immediately | 69 | 107 | 138 |
| 1 week | 69 | 107 | 138 |
| 2 weeks | 66 | 92 | 141 |
| 3 weeks | 63 | 72 | 135 |
| 4 weeks | 61 | 69 | 139 |
| 5 weeks | 59 | 63 | 129 |

Example 3.1.2

Results for Plasticized PVC

10" shock activation according to a surface temperature of the adhesive film of 92° C.

| Storage time of the preparation | Softening (° C.)* |
| --- | --- |
| immediately | 111 |
| 1 week | 113 |
| 5 weeks | 110 |
| 8 weeks | 102 |

The polyurethane dispersion used in the examples gave a softening point of approximately 65° C. when bonded in the same manner without crosslinking.

Example 3.2

Resistance to Heat-Peeling After Bonding by the Hot-Press Process (Beech Wood/Rigid PVC)

Preparation of the test specimens

The composition containing a polymer dispersion and TDI dimer prepared in 1. was applied to a planed sheet of beech wood (according to DIN 53-254, dimensions: 50×140×4 mm) using a brush. The adhesive was applied to only one side of the beech wood test specimen. The surface to be bonded was 50×110 mm. After a drying time of 30 minutes at ambient temperature, a second adhesive layer was applied over the first and then dried at ambient temperature for 60 minutes. After the drying time, pressing with the unstructured side of a rigid PVC coating film (type: Benelitfolie RTF, dimensions: 50×210×0.4) was carried out in a membrane press for 10 seconds at 4 bar eff. pressure and a joint temperature of 90° C.

Determination of the thermal stability

The joined test specimens were stored for 3 days at room temperature. The thermal stability was determined in a Universal warming cabinet with automatic temperature adjustment. The unbonded end of the beech wood test specimen was secured at the top to a holder having a wing screw. The projecting end of the PVC test strip was loaded vertically downwards at an angle of 180° with a 500 g weight. The start temperature was 50° C. After one hour the temperature was increased automatically by 10° C. until the PVC strip became completely detached (or was torn) from the wooden test specimen.

Results (Double Determination)

| Storage time of the preparation | Thermal stability* ° C. |
| --- | --- |
| immediately | >120 (tearing of the film) |
|  | >120 |
| 1 week | >120 |
|  | >120 (tearing of the film) |
| 5 weeks | >120 |
|  | 5 minutes 120° |
| 8 weeks | 10 minutes 120° |
|  | >120 |
| 9 weeks | >120 |

*Thermal stability of the bond with the polyurethane dispersion (see example 1) without crosslinking: approx. 85° C.

Example 3.3

Conclusions Regarding Effect of Storage of the Liquid Adhesive Composition on the Adhesive Properties After Heat Activation The preceding tests demonstrated that:

I. Even after the composition according to the invention, which contained the non-deactivated solid isocyanate, had been stored for a long time, crosslinking of the adhesive polymer took place after bonding (see tables in 3.1.1, 3.1.2 and 3.2).

II. Neither tempering nor a catalyst was required to initiate crosslinking (in contrast to the description of EP-A 0 922 720).

III. Instead, crosslinking was initiated by subjecting the adhesive layer to infrared radiation for a very short time, which brought about the decrystallization of the polymer that was necessary for bonding (see table in 3.1.1 and compare the results for 3" activation (49° C.) with the results for 5" (65° C.) and 10" (105° C.). The decrystalisation temperature of the used polyurethane dispersion is about 55° C.).

IV. If the temperature required for decrystallization of the polymer chain was not exceeded, no improvement in the softening point of the bond takes place (see table 3.1.1).

V. In addition, the comparison shows that the crosslinking in the test specimens was not initiated by the heat that acts during the test (running from 40–150° C.) but it really is the result of the heat-activated bonding step. If the crosslinking were initiated by the heat that acts during the test then all the results would have to have been obtained independently of the activation conditions.

Example 4

Effect of the Storage Time of the Adhesive Film on Crosslinking After Bonding by Heat Activation Example 4.1

The Adhesive Film Applied to the Substrate (SBR Rubber) on the Softening Point (Shear Stress) on Bonding by Heat Activation The composition containing a polymer dispersion and TDI dimer prepared in 1. was applied to test specimens of Nora rubber and dried at room temperature. After storage of the coated substrates for 1, 2, 3, 4, 8 and 12 weeks (open in a climatic chamber at 23° C.), bonding was carried out in accordance with the description given under 3.1 according to 10" heat activation. The test gave the following softening points:

| Open storage time of the coated samples | Softening point (° C.) |
| --- | --- |
| 1 week | 134 |
| 2 weeks | 113 |
| 3 weeks | 91 |
| 4 weeks | 85 |
| 8 weeks | 71 |

It follows from this result that the adhesive films according to the invention containing non-deactivated solid isocyanate can—in contrast to EP-A 0 922 720—be stored for a period of two weeks without any impairment of the crosslinkability. That available time was totally sufficient for conventional requirements in the industrial processing of the adhesive and even permits limited intermediate storage of pre-coated SBR rubber surfaces.

Example 4.2

Effect of the Storage Time of the Adhesive Film on the Resistance to Heat-Peeling on Bonding by Hot-Pressing (Rigid PVC/Beech Wood Substrate)

The composition containing a polymer dispersion and TDI dimer prepared in 1. was applied to test specimens of planed beech wood and dried at room temperature. After storage of the coated substrates for 1, 2, 3, 4, 8 and 12 weeks (open in a climatic chamber at 23° C.), bonding and testing were carried out in accordance with the description given under 3.2 by hot-pressing at a joint temperature of 90° C.

Results

| Open storage time of the coated samples | Thermal stability* ° C. |
| --- | --- |
| immediately | >120 |
| 1 week | >120 |
| 2 weeks | >120 |
| 4 weeks | >120 |
| 9 weeks | >120 |

*Thermal stability of the bond with the polyurethane dispersion (see Example 1) without crosslinking: approx. 85° C.

It follows from this result, as from 4.1, that the storage life of the preparation according to the invention permits bonding even over a prolonged period in spite of the non-deactivated solid isocyanate, without a reduction in crosslinkability becoming apparent over 9 weeks at the demands applicable in that case.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An aqueous dispersion comprising
   i) an isocyanate-reactive polymer comprising a member selected from the group consisting of polyurethanes, polyureas, and polymers and copolymers of 2-chlorobutadiene and
   ii) a non-deactivated polyisocyanate, wherein the polyisocyanate has a melting or softening point of >30° C. and is in the form of a finely divided powder having a mean particle diameter of less than 100 μm.

2. The aqueous dispersion of claim 1 wherein the finely divided powders have a mean particle diameter of less than 50 μm.

3. The aqueous dispersion of claim 1 wherein the aqueous dispersion has a viscosity of at least 500 mPa.s at 23° C.

4. The aqueous dispersion of claim 1 wherein the aqueous dispersion has a viscosity of at least 2000 mPa.s at 23° C.

5. The aqueous dispersion of claim 2 wherein the aqueous dispersion has a viscosity of at least 2000 mPa.s at 23° C.

6. The aqueous dispersion of claim 1 wherein the isocyanate-reactive polymer comprises a polyurethane which is composed of crystallized polymer chains which at least partially decrystallize at a temperature of less than 110° C.

7. The aqueous dispersion of claim 5 wherein the isocyanate-reactive polymer comprises a polyurethane which is composed of crystallized polymer chains which at least partially decrystallize at a temperature of less than 110° C.

8. The aqueous dispersion of claim 1 wherein the isocyanate-reactive polymer comprises a polymer or copolymer of 2-chlorobutadiene.

9. The aqueous dispersion of claim 5 wherein the isocyanate-reactive polymer comprises a polymer or copolymer of 2-chlorobutadiene.

10. The aqueous dispersion of claim 1 wherein the polyisocyanate comprises a dimerization product, a trimerization product or a urea derivative of TDI or IPDI.

11. The aqueous dispersion of claim 5 wherein the polyisocyanate comprises a dimerization product, a trimerization product or a urea derivative of TDI or IPDI.

12. The aqueous dispersion of claim 6 wherein the polyisocyanate comprises a dimerization product, a trimerization product or a urea derivative of TDI or IPDI.

13. The aqueous dispersion of claim 7 wherein the polyisocyanate comprises a dimerization product, a trimerization product or a urea derivative of TDI or IPDI.

14. The aqueous dispersion of claim 8 wherein the polyisocyanate comprises a dimerization product, a trimerization product or a urea derivative of TDI or IPDI.

15. The aqueous dispersion of claim 9 wherein the polyisocyanate comprises a dimerization product, a trimerization product or a urea derivative of TDI or IPDI.

16. A process for the production of an adhesive bond which comprises
   a) applying an aqueous dispersion comprising an isocyanate-reactive polymer and a non-deactivated polyisocyanate, wherein the polyisocyanate has a melting or softening point of >30° C. and is in the form of a finely divided powder having a mean particle diameter of less than 100 µm, to a first substrate to be bonded, b) drying the aqueous dispersion to form a dried adhesive layer, c) decrystallizing the dried adhesive layer by heating the adhesive layer above the decrystallization temperature of the polymer and d) joining the adhesive layer in the decrystallized state to the second substrate to be bonded.

17. The process of claim 16 wherein the second substrate to be bonded is a foil material softened plastically by heating.

18. The process of claim 17 wherein the foil in contact with the adhesive layer has a temperature above the decrystallization temperature of the polymer in the adhesive layer.

19. An adhesive composition containing the aqueous dispersion of claim 1.

20. An adhesive film prepared from the aqueous dispersion of claim 1, which crosslinks at room temperature without subsequent heat treatment.

* * * * *